US008528055B2

(12) United States Patent
Bellwood et al.

(10) Patent No.: US 8,528,055 B2
(45) Date of Patent: Sep. 3, 2013

(54) PROCESSING PERFORMANCE OF REPEATED DEVICE COMPLIANCE UPDATE MESSAGES

(75) Inventors: Thomas A. Bellwood, Austin, TX (US); Robert G. Deen, San Jose, CA (US); Jeffrey B. Lotspiech, Henderson, NV (US); Matthew F. Rutkowski, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/950,244

(22) Filed: Nov. 19, 2010

(65) Prior Publication Data

US 2012/0131638 A1    May 24, 2012

(51) Int. Cl.
G06F 7/04         (2006.01)
H04L 9/32         (2006.01)

(52) U.S. Cl.
USPC ............ 726/4; 726/5; 726/6; 726/17; 726/27; 726/30; 713/179; 713/180; 380/277

(58) Field of Classification Search
USPC .................. 726/4, 5, 6, 17, 27, 30; 713/179, 713/180; 380/380, 277
See application file for complete search history.

(56) References Cited

U.S. PATENT DOCUMENTS

| 5,680,457 | A  | * | 10/1997 | Bestler et al. ................. 380/239 |
| 7,079,812 | B2 |   | 7/2006  | Miller et al. |
| 7,468,969 | B2 |   | 12/2008 | Zuniga |
| 7,500,269 | B2 |   | 3/2009  | Huotari et al. |
| 7,568,092 | B1 |   | 7/2009  | Englund |
| 2003/0198351 | A1 | * | 10/2003 | Foster et al. .................. 380/281 |
| 2004/0143555 | A1 | * | 7/2004  | Vega Crespo et al. .......... 705/67 |
| 2008/0212576 | A1 | * | 9/2008  | O'Neill ......................... 370/356 |
| 2010/0332506 | A1 | * | 12/2010 | Deen et al. .................... 707/759 |

OTHER PUBLICATIONS

Bahr, Michael, "Proposed Routing for IEEE 802.11s WLAN Mesh Networks", *ACM Digital Library* Aug. 2006, 10 pages.
Diesburg, Sarah M. et al., "When Cryptography Meets Storage", *ACM Digital Library* Oct. 31, 2008, pp. 11-24.

(Continued)

*Primary Examiner* — Beemnet Dada
*Assistant Examiner* — Kalish Bell
(74) *Attorney, Agent, or Firm* — DeLizio Gilliam, PLLC (57) ABSTRACT

A first message comprising a received indication of a management key block (MKB) and a received indication of an authorization table (AT) is received at a first network device from a second network device. The received indications of the MKB and AT are validated by comparing them to generated indications of the MKB and AT, respectively. A response is generated based on the validation of the received indications and transmitted from the first network device to the second network device. The generated indications and response are stored. A second message comprising a second received indication of the MKB and a second received indication of the AT is received at the first network device from the second network device. The first network device communicates with the second network device in accordance with the stored response on determining that the second received indications match corresponding stored indications.

20 Claims, 5 Drawing Sheets

(56) References Cited

OTHER PUBLICATIONS

Hendricks, James et al., "Secure Bootstrap Is Not Enough: Shoring up the Trusted Computing Base", *ACM Digital Library: Proceedings of the Eleventh SIGOPS European Workshop, ACM SIGOPS*, Leuven, Belgium http://www.pdl.cmu.edu/PDL-FTP/stray/sigops04-bootstrap.pdf Sep. 2004, pp. 1-5.

IBM, , "Configuration and Execution of WS-Security Policy behavior in Filter and Transform Modes", *IP.COM Prior Art Database* Mar. 11, 2009, 3 pages.

IBM, , "IBM Response to DVB-CPT Call for Proposals for Content Protection & Management: xCP Cluster Protocol", Oct. 19, 2001, 36 pages.

Deen, G et al., "Broadcast Encryption: Paving the Road to Practical Content Protection Systems", SPIE-IS&T Electronic Imaging, SPIE vol. 7254 2009, 11 pages.

\* cited by examiner

PROCESSING PERFORMANCE OF REPEATED DEVICE COMPLIANCE UPDATE MESSAGES

BACKGROUND

Embodiments of the inventive subject matter generally relate to the field of security, and, more particularly, to improving processing performance of repeated device compliance messages using broadcast encryption.

Content and service providers can use communication networks (e.g., the Internet) to distribute high quality content (e.g., movies, music, etc.), critical operational and personal data, etc. The content and service providers need to ensure that the collected and managed data remains compliant to security policies and privacy requirements. To control security and restrict access to the content, the content can be protected by encryption, digital rights management (DRM) systems, or conditional access (CA) systems.

Advanced Secure Content Cluster Technology (ASCCT) is a messaging protocol built upon broadcast encryption that enables content protection and device compliance for one or more content control domains. The ASCCT protocol is designed to establish authorized domains of ASCCT compliant devices and trusted service providers (e.g., home networks) to protect content from being improperly distributed. The ASCCT protocol assists in enforcing device compliance using a management key block (MKB) which can be used to revoke keys associated with compromised device(s) or to control device authorizations using a per-network authorization table (AT). Revoked or unauthorized devices are prevented from decrypting protected content bound to a particular network that supports the ASCCT protocol.

SUMMARY

Embodiments include a method comprising receiving, at a first network device, a first message comprising at least a received indication of a management key block and a received indication of an authorization table from a second network device. The received indication of the management key block is validated by generating an indication of the management key block and comparing the generated indication of the management key block with the received indication of the management key block. The received indication of the authorization table is validated by generating an indication of the authorization table and comparing the generated indication of the authorization table with the received indication of the authorization table. A response to the first message is generated based on the validation of the received indication of the management key block and authorization table. The response is transmitted to the second network device via a communication network. The generated indication of the management key block, the generated indication of the authorization table and the response is stored at the first network device. A second message comprising at least a second received indication of the management key block and a second received indication of the authorization table is received at the first network device from the second network device. It is determined that the second received indication of the management key block matches the stored indication of the management key block and that the second received indication of the authorization table matches the stored indication of the authorization table. The first network device communicates with the second network device in accordance with the stored response.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to processing IMHERE messages broadcasted by ASCCT compliant devices, embodiments are not so limited. In other implementations, various other periodically transmitted messages can be processed in accordance with processing techniques described herein. Furthermore, although examples refer to a two device example of the ASCCT protocol that uses peer-to-peer messaging, in other implementations an ASCCT network can comprise any suitable number of ASCCT compliant devices that communicate using other suitable message techniques (e.g., using client-server model). In other instances, well-known instruction instances, protocols, structures, and techniques have not been shown in detail in order not to obfuscate the description.

in an ASCCT environment, ASCCT compliant devices continually broadcast IMHERE messages to join an ASCCT network or to maintain device compliance after joining the ASCCT network. The IMHERE messages comprise one-way cryptographic hashes of critical binding materials (e.g., a management key block (MKB), an authorization table (AT), etc.). The MKB enables any ASCCT compliant device that has not been revoked to decrypt ASCCT-protected content (e.g., music, video, podcasts, online books, operational and personal data, etc.). The AT comprises a list of ASCCT devices authorized to share the ASCCT-protected content in the network. Other ASCCT devices in the network receive the IMHERE message, retrieve the MKB and the AT associated with the IMHERE message and validate the retrieved MKB and the retrieved AT to establish the authenticity of a transmitting ASCCT device, and to verify that the transmitting ASCCT device has not been revoked. Validating the MKB involves retrieving the MKB, calculating a hash of the MKB, comparing the calculated hash of the MKB against the received hash of the MKB, validating the type, version, and signature of the MKB. Validating the AT involves retrieving the AT, calculating a hash of the AT, comparing the calculated hash of the AT against the received hash of the AT, and validating the signature of the AT. Furthermore, based on validating the MKB and the AT, the receiving ASCCT devices determine whether to communicate with or to reject the transmitting ASCCT device and accordingly generate a response to the IMHERE message. Operations for validating the MKB and the AT involve both initialization and execution of computationally expensive cryptographic calculations. Moreover, because the IMHERE message is a broadcast message, all the ASCCT devices in the network continually receive IMHERE messages from other ASCCT devices in the network and, also from ASCCT devices that wish to join the network. Processing such a multitude of IMHERE messages can result in a high processing overhead and can be a time-intensive and resource intensive process.

The process by which the ASCCT devices validate the MKB and the AT of a transmitting ASCCT device can be simplified by relying on the fact that if input parameters (e.g., the MKB and the AT) of the IMHERE message do not change, the response to the IMHERE message will not change. The receiving ASCCT device can be configured to cache a cryptographic hash value of the MKB ("cached MKB hash") and a cryptographic hash value of the AT ("cached AT hash") received in a first IMHERE message from the transmitting ASCCT device. The receiving ASCCT device can also determine and cache a response generated in response to the first IMHERE message from the transmitting ASCCT device. The receiving ASCCT device can use the cached MKB hash, the cached AT hash, and the cached response to avoid executing computationally intensive validation operations when subsequent IMHERE messages are received from the same transmitting ASCCT device with the same message body. The receiving ASCCT device can validate the transmitting ASCCT device by comparing cryptographic hash values of the MKB and AT received in the subsequent IMHERE messages with the cached MKB hash and the cached AT hash respectively. If there is a match, then the cached response can be retrieved and can be provided to the transmitting ASCCT device. If there is a mismatch between the received cryptographic hashes of the MKB and AT and the cached cryptographic hashes of the MKB and the AT, the receiving ASCCT device can request a new version of the MKB and/or the AT from the transmitting ASCCT device. Processing the IMHERE message based on previously cached results precludes the need for instantiating ciphers and performing cryptographic hash calculations for every IMHERE message received from the transmitting ASCCT device, thus reducing processing time. This can also reduce network overhead, reduce resource power consumption, and reduce the burden of processing requests while maintaining device compliance in the ASCCT environment.

Figure 1:
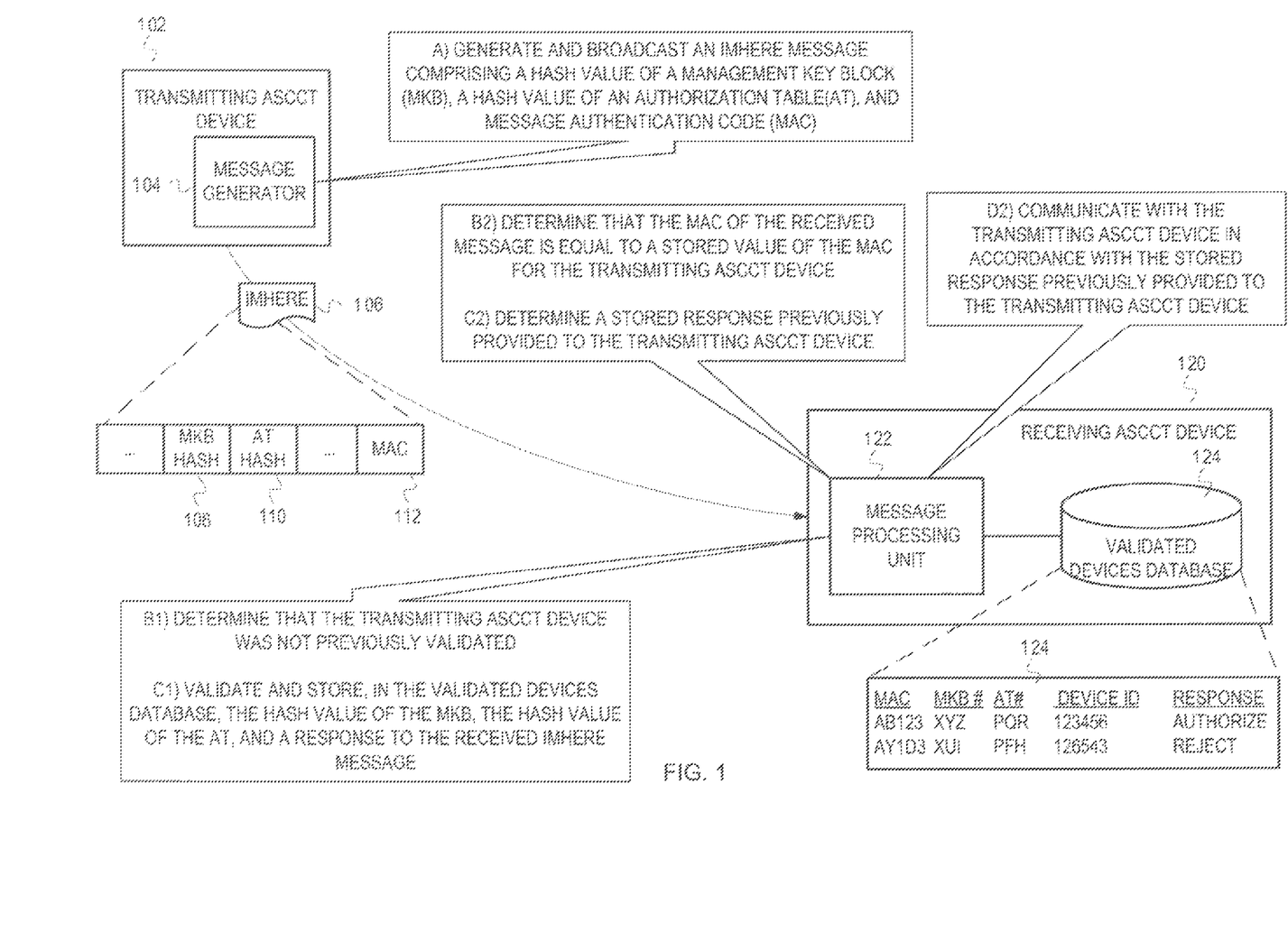
FIG. 1 is an example conceptual diagram illustrating processing of device compliance messages.

FIG. 1 is an example conceptual diagram illustrating processing of device compliance messages. FIG. 1 depicts a transmitting ASCCT device 102 and a receiving ASCCT device 120. The transmitting ASCCT device 102 comprises a message generator 104. The receiving ASCCT device 120 comprises a message processing unit 122 coupled with a validated devices database 124. The receiving ASCCT device 120 may be part of a home network and may be a consumer electronic device such as a personal computer (PC), book reader, personal digital assistant (PDA), a cable or satellite set-top box, a television (TV), an Internet protocol TV (IPTV) receiver, mobile phones, portable drives, and other content players (e.g., a Blu-Ray™ disk player, DVD/CD players, etc.), video recorders, that implement an ASCCT protocol. In some implementations, the ASCCT devices 120 and 102 may also be virtual devices, software application clients, or client services.

The ASCCT protocol is built upon broadcast encryption that enables content protection and device protection. In accordance with the ASCCT protocol and broadcast encryption, ASCCT devices (e.g., the receiving ASCCT device 120) in a peer-to-peer network can validate other peer ASCCT devices (e.g., the transmitting ASCCT device 102) and agree upon a common management key block (MKB). As described above, the MKB provides access to a common management key and enables any ASCCT compliant device that has not been revoked to decrypt ASCCT-protected content. The MKB can be configured so that unauthorized ASCCT devices are precluded from decrypting the ASCCT-protected content or the ASCCT-protected content stream. A licensing authority (not shown) such as an authorized content provider (e.g., a cable company) can generate and distribute the MKB to the ASCCT devices either with the ASCCT protected content or separate from the ASCCT protected content. In some implementations, the licensing authority can generate an enhanced management key block (eMKB) associated with the ASCCT protected content and can provide the eMKB to the ASCCT device 120 in conjunction with the ASCCT protected content. Additionally, the licensing authority can create and distribute an eMKB unique to servers and client devices associated with the service provider. The MKB (or eMKB) can be delivered concurrent with the content (e.g., at the beginning of a linear broadcast), or can be obtained "out-of-band" from a broadcast or interne service, received from other devices that are part of the same key space or placed on physical media (e.g., in the case of pre-recorded content and recordable content).

The ASCCT devices can use the MKB (or the eMKB), which is a block of cryptographic key data, in conjunction with a set of device keys ($K_D$) located on the receiving ASCCT device (e.g., a content player, a content renderer, etc.) to derive one or more management keys ($K_M$). The receiving ASCCT device 120 can use the management keys to directly or indirectly decrypt one or more content keys that can each be used to decrypt all/part of the ASCCT protected content. The content keys can comprise a single title key ($K_T$), sets of title keys (for the same piece of content), volume keys, sector keys, disk keys, etc. and can be generalized to any granularity of key used to protect the content. In accordance with the MKB, the ASCCT protected content can be encrypted using one title key or using multiple title keys. For example, an MKB configuration could employ title key blocks to assign different ASCCT devices to different security classes and to enable the ASCCT devices to derive a title key that corresponds to the security class to which the ASCCT devices are assigned. Furthermore, large blocks of the content may be divided into volumes, sectors, or disks, each of which are associated with a separate title key. For example, high definition video content may be divided into sectors that correspond to a progression of title keys that change either on a sector-by-sector basis or periodically during the course of a linear broadcast of the content. It is noted that, via broadcast encryption, two or more devices, which might be previously unknown to each other, can agree upon a key over a one-way communication path, thus enabling communication between two security system components.

It is noted that in some implementations, multiple management keys or management key variants ($K_{MV}$) can be used instead of a single management key. The management key variants are employed for forensic purposes in situations where the content is authored with different equivalent variations. Instead of using the device keys to directly derive the management key, a device employs the device keys to derive a management key variant, which is then employed to derive a base management key. A device can also be assigned to a security class and can derive a management key precursor $K_M(-i)$ from the management key variant based on the security class (i) to which the device is assigned. Devices assigned to a higher security classes are associated with higher "i" values. For example, a device with a security class of '3' would be of a higher security class than a device with a class of '1'. A base security class is a lowest security class (or security class 0). A device in a security class higher than the base class may calculate a $K_M(-i)$ for devices in a lower security class by iteratively executing the one-way function $K_M^{-(i-1)} = AES\_G(K_M^{-1}, kcd)$, where kcd is a keyspace specific constant. Recording keys (which are similar to management key variants) can also be employed when content is recorded locally in a particular cluster The ASCCT devices (or other devices that implement broadcast encryption) "bind" the data/content they protect to a particular entity (e.g. storage media, a user, an account, a home network or cluster of one or more devices). The entity to which the content is logically bound to is represented by a domain unique binding identifier ($ID_B$) that is cryptographically combined with one or more management keys ($K_M$) to produce a binding key ($K_B$). It should be noted that the one or more management keys used in conjunction with the binding key can be used as a basis of secure communication between devices in the same network, cluster, or authorization table (AT), which is a list of authorized devices in a particular cluster. An example of how a $K_B$ is derived from a simple $K_M$, which is itself derived from a MKB, is explained below. The content can be bound to a particular entity (regardless of whether the entity is a piece of media, a device, or a user), through one level of indirection in the calculation of the content's encrypted title key (Ekt) from the entity's binding key (Kb). The process by which the piece of content can be encrypted is as follows,
1) Process the MKB to extract a management key ($K_M$).
2) Perform a one-way function (represented as G( )) to a piece of data (e.g., the domain unique binding identifier $TD_B$) that uniquely identifies the entity to which the content is being bound using the management key to generate a binding key (i.e. $K_B = G(K_M, ID_B)$). If the content is being bound to a cluster of devices or a network, the domain unique binding identifier represents a unique network identifier.
3) Select a title key ($K_T$), which may be either random or predetermined, for the content and encrypt (represented by E( )) the title key using the binding identifier ($K_B$) to generate an encrypted title key ($EK_T$) (i.e. $EK_T = E(K_B, K_T)$).
4) Encrypt the content with the title key and store the encrypted content is stored in conjunction with the encrypted title key ($EK_T$).

If the MKB supports multiple security classes, steps 1-4 (described above) can be executed for each management key at the desired security class to create a set of title keys. Implementations may choose to use the same set of title keys to protect a logical volume of content or all or portions of a disk of content. On receiving the encrypted content (or an encrypted communication), any compliant device that has access to the same MKB, $ID_B$ and $EK_T$ can decrypt the content (or communication) by reproducing the same $K_B$ and decrypting $K_T$.

In accordance with broadcast encryption, groups, domains, or "clusters", of devices can be combined into secure authorized logical networks. For example, the ASCCT devices agree upon a single set of authorized devices by which the transmitting ASCCT device 102 and the receiving ASCCT device 120 can secure and exchange content. The set of authorized devices is represented by an authorization table (AT) that comprises a list of devices authorized to share the ASCCT-protected content in an ASCCT network. The AT identifies each ASCCT device in the network and indicates an authorization state associated with each ASCCT device in the network. The authorization state can indicate whether an ASCCT device in the peer-to-peer network is authorized (e.g., authorized as a compliant device in a current network), deleted (e.g., removed from the current network), suspended (e.g., because device compliancy cannot be verified), revoked (e.g., because the ability of the ASCCT device to process the MKB and decrypt the content is revoked), etc. In other words, the AT tracks ASCCT devices as they are authorized (e.g., by other ASCCT devices), revoked (by an authorized service provider via the MKB), or suspended by the authorized service provider. The ASCCT protocol can maintain compliance and authorization state for one or more security domains. If a device's authorization state is changed (e.g., a new device is authorized, a device is suspended or deleted from the ASCCT network), the AT is updated to reflect the change. The AT is a component of the binding key ($K_S$) and therefore, if the AT is updated, any data encrypted by the binding key (e.g. title keys) would also need to be re-encrypted. Furthermore, the domain unique binding identifier ($ID_B$) may also change, resulting in a need for the binding key and all other content keys to be updated.

It is noted that the above description was a brief overview of some of the functionality of ASCCT and broadcast encryption. Stages A, B1-C1 and stages B2-D2 of FIG. 1 describe operations of the ASCCT devices for improving processing performance of repeated device compliance messages.

At stage A, the message generator 104 of the transmitting. ASCCT device 102 generates an IMHERE message 106 comprising a cryptographic hash value of a management key block (MKB) 108 ("MKB hash"), a cryptographic hash value of an authorization table (AT) 110 ("AT hash"), and message authentication code (MAC) 112. The MKB hash 108 and the AT hash 110 respectively represent the most recent version of the MKB and the AT available at the transmitting ASCCT device 102. The MAC 112 is a cryptographic hash of input parameters of the IMHERE message 106. The input parameters of the IMHERE message 106 comprise the MKB hash 108, the AT hash 110, a session identifier, and other parameters of the transmitting ASCCT device 102, such as a cluster identifier, a device identifier, a location, etc. The MAC 112 is appended to the input parameters of the IMHERE message 106 and is transmitted as part of the IMHERE message 106.

The transmitting ASCCT device 102 can be a foreign ASCCT device (e.g., an ASCCT device that wishes to join a particular network) and can transmit the IMHERE message 106 as a request to join the network. For example, the transmitting ASCCT device 102 may be a newly purchased and installed ASCCT device. The transmitting ASCCT device 102 can identify available networks (e.g., the network to which the receiving ASCCT device 120 belongs) and can broadcast the IMHERE message 106 to indicate availability and to initiate an authentication process to join the network. The transmitting ASCCT device 102 can also periodically broadcast the IMHERE message 106 after being authorized to join the network. In doing so, the transmitting ASCCT device 102 can signal peer ASCCT devices of changes to the AT or the MKB, can verify that the version of the MKB and/or the AT available at the transmitting ASCCT device 102 is the most recent version of the MKB and/or the AT of the network, and can ensure compliance at all points of time. In a peer-to-peer ASCCT network, the transmitting ASCCT device 102 can be authorized to join the network of the receiving network device 120 if the transmitting network device 102 can prove (e.g., by transmitting the device compliance IMHERE message) that it is not a circumvention device or an unauthorized device. This will be further be described in stages B1-C1 and stages B2-D2.

At stage B1, the message processing unit 122 of the receiving ASCCT device 120 determines that the transmitting ASCCT device 102 was not previously validated. The message processing unit 122 can access the validated devices database 124 and can determine whether the transmitting ASCCT device 102 was previously validated. For example, the message processing unit 122 can read a device identifier of the transmitting ASCCT device 102 from the IMHERE message 106 and can determine whether an entry corresponding to the device identifier exists in the validated devices database 124.

At stage C1, the message processing unit 122 validates the transmitting ASCCT device 102 based on the input parameters of the received WHERE message 106. The message processing unit 122 receives an underlying MKB that corresponds to the MKB hash 108 and an underlying AT that corresponds to the AT hash 110. The message processing unit 122 can cause various other processing and computational components of the receiving ASCCT device 120 (e.g., a validation unit, not shown) to be loaded for validating the transmitting ASCCT device 102. The validation unit processes the underlying MKB to determine the validity of the MKB (e.g., the validity of a type, version, signature, and other properties of the MKB). Likewise, the validation unit processes the underlying AT to determine the validity of the AT (e.g., the validity of the signature and other properties of the AT). The validation unit also determines a response to be provided to the transmitting ASCCT device 102 based, at least in part, on results of validating the MKB and the AT of the transmitting ASCCT device 102. For example, if the validation unit determines that the MKB and AT of the transmitting ASCCT device 102 are valid, the receiving ASCCT device 120 can authorize the transmitting ASCCT device 102 to join the network. The message processing unit 122 stores, in the validated devices database 124, the MKB hash 108, the AT hash 110, and a response generated in response to the IMHERE message 106. The message processing unit 122 can also store a device identifier of the transmitting ASCCT device 102 and the MAC 112 in the validated devices database 124.

The message processing unit 122 performs a different set of operations if the message processing unit 122 determines that the transmitting ASCCT device 102 was previously validated and was recognized as an authorized or a rejected ASCCT device. These operations are described in stages B2-D2.

At stage B2, the message processing unit 122 determines that the MAC 112 of the received IMHERE message 106 ("received MAC") is equal to a stored value of the MAC ("stored MAC") for the transmitting ASCCT device 102. The stored MAC is a cryptographic hash of a first IMHERE message that was broadcast by the transmitting. ASCCT device 102. In some implementations, the message processing unit 122 can access the validated devices database 124 and determine whether the transmitting ASCCT device 102 was previously validated. For example, the message processing unit 122 can determine whether an entry corresponding to the device identifier in the IMHERE message 106 exists in the validated devices database 124. If the entry exists, the message processing unit 122 can identify the stored MAC and can compare the received MAC 112 with the stored MAC. With reference to FIG. 1, the message processing unit 122 may determine (from the IMHERE message 106) that the device identifier of the transmitting ASCCT device is "123456". The message processing unit 122 may then determine that an entry corresponding to the device identifier "123456" exists in the validated devices database 124. On determining that an entry associated with the transmitting ASCCT device 106 exists in the validated devices database 124, the message processing unit 122 reads the stored MAC from the validated devices database 124. The message processing unit 122 compares the stored MAC with the received MAC 112 and determines that the received MAC 112 matches the stored MAC. Because the MAC is a cryptographic hash of all the input parameters of the IMHERE message 106, the received MAC 112 being equal to the stored. MAC indicates that the input parameters of the IMHERE message 106 have not changed as compared to input parameters of the first IMHERE message broadcast by the transmitting ASCCT device 102. In other words, the versions of the MKB and the AT available at the transmitting ASCCT device 102 have not changed since the last time the transmitting ASCCT device 102 was validated.

At stage C2, the message processing unit 122 determines a stored response previously provided to the transmitting ASCCT device 102. As described above, when the receiving ASCCT device 120 receives and processes a first IMHERE message from the transmitting ASCCT device 102, the receiving ASCCT device 120 generates and stores a response to be provided to the transmitting ASCCT device 102. The response indicates whether the transmitting ASCCT device 102 is authorized to join the network, whether the transmitting ASCCT device 102 is rejected, etc. As was described at stage B2, the receiving ASCCT device 120 determines that the transmitting ASCCT device 102 was previously validated and that the input parameters of the IMHERE message 106 are the same as the input parameters of the first IMHERE message broadcast by the transmitting ASCCT device 102. Therefore, at stage C2, the receiving ASCCT device 120 uses the stored response associated with the transmitting ASCCT device 102 to determine how to communicate with the transmitting ASCCT device 102. For example, with reference to FIG. 1, the message processing unit 122 may determine that the received MAC 112 is AB123, may determine that the received MAC 112 matches the stored MAC of the transmitting ASCCT device 102, and, based on the corresponding stored response, may determine that the transmitting ASCCT device 102 was previously authorized to join the network. As another example, the message processing unit 122 may determine that the received MAC 112 is AY1D3, may determine that the received MAC 112 matches the stored MAC of the transmitting ASCCT device 102, and based on the corresponding stored response, may determine that the transmitting ASCCT device 102 was previously rejected.

At stage D2, the receiving ASCCT device 120 communicates with the transmitting ASCCT device 102 in accordance with the stored response previously provided to the transmitting ASCCT device 102. For example, the receiving ASCCT device 120 may determine, based on the stored response, that the transmitting ASCCT device 102 was authorized to join the network. The receiving ASCCT device 120 may not transmit another authorization response but may continue to communicate with the transmitting ASCCT device 102 (e.g., share or sync content, etc.). As another example, the receiving ASCCT device 120 may determine that the transmitting ASCCT device 102 was previously rejected (e.g., because of an invalid MKB and/or an invalid AT). The receiving ASCCT device 120 may retransmit the stored response rejecting the transmitting ASCCT device 102.

Although not depicted in FIG. 1, it is noted that the message processing unit 122 may determine that the received MAC 112 is different from the stored MAC associated with the transmitting ASCCT device 102. The message processing unit 122 then analyses the MKB hash 108 and the AT hash 110 to determine whether an underlying MKB associated with the MKB hash 108 and/or an underlying AT associated with the AT hash 110 have changed. The message processing unit 122 compares the MKB hash 108 and the AT hash 110 with the stored MKB hash and the stored AT hash respectively and determine whether the MKB and/or the AT have changed. For example, if the MKB hash 108 is different from the stored MKB hash, the message processing unit 122 determines that the underlying MKB at the transmitting network device 102 has changed. Likewise, if the AT hash 110 is different from the stored AT hash, the message processing unit 122 determines that the underlying AT at the transmitting network device 102 has changed. Accordingly, the receiving ASCCT device 120 requests updates of the MKB and/or the AT from the transmitting ASCCT device 102. On receiving an updated version of the MKB and/or the AT, the receiving ASCCT device 120 determines the validity of the updated version of the MKB and/or the updated version of the AT as described with reference to stage B1. The receiving ASCCT device 120 also generates a new response to be provided to the transmitting ASCCT device 102 in light of the updated version of the MKB and/or the AT (e.g., authorize the transmitting ASCCT device 102 on determining that the updated version of the MKB and the AT are valid, reject the transmitting ASCCT device 102 on determining that the transmitting ASCCT device 102 has been revoked in the updated version of the MKB, etc.). The receiving ASCCT device 120 updates the validated devices database 124 to reflect the hash value of the updated MKB, the hash value of the updated AT, an updated MAC, and/or the new response.

It is noted that the ASCCT devices are not limited to communicating in a peer-to-peer network. In some implementations, the ASCCT devices may be part of a server-client network. Server devices or service providers may also be part of the ASCCT network (e.g., a trusted home network domain) and the authorization table. With reference to FIG. 1, the receiving ASCCT device 120 may be a server (e.g., a cable or a satellite service provider, a content provider, or other content control system). Techniques described herein for validating the ASCCT devices may be executed in the server-client network via a centralized server. For example, a cable service provider that provides ASCCT encrypted content may be an authorized member of each home network that it services and may also distribute updated MKBs to other devices in the home network. The ASCCT devices can communicate via any suitable network (e.g., local area network (LAN), personal area network (PAN), etc.) using wired (e.g., Ethernet) or wireless (e.g., Wi-Fi) communication techniques. Furthermore, the ASCCT protocol can be implemented independent of a transport protocol (e.g., transport control protocol (TCP), user datagram protocol (UDP), datagram congestion control protocol (DCCP), etc.) supported by the network. Furthermore, an ASCCT device could also be part of multiple ASCCT networks (or ASCCT domains). For example, an ASCCT compliant content player might be part of a cable provider's network and an internet based content provider's network.

Figure 2:
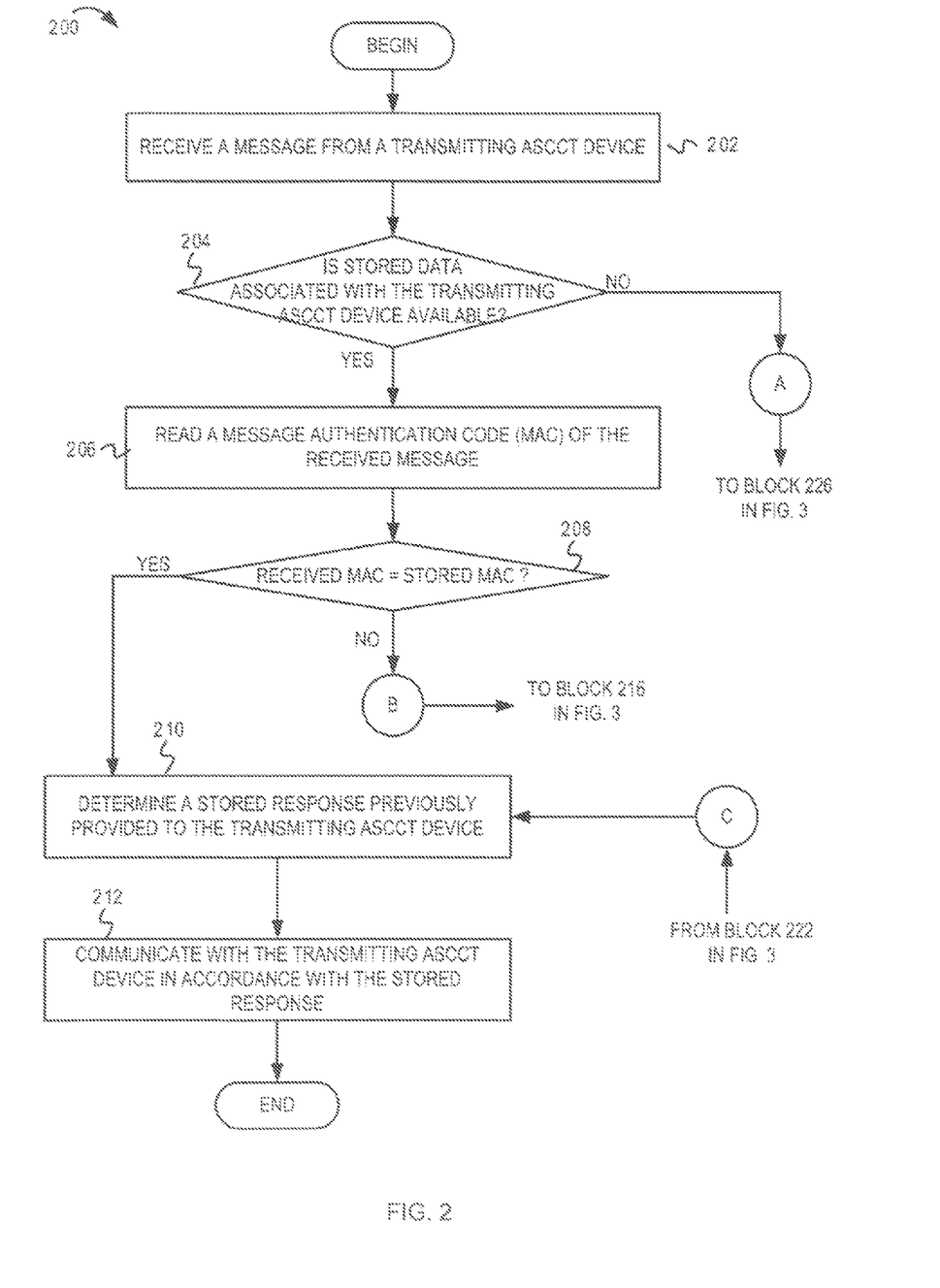
FIG. 2 and FIG. 3 depict a flow diagram illustrating example operations for establishing device compliance in an ASCCT network.
Figure 3:
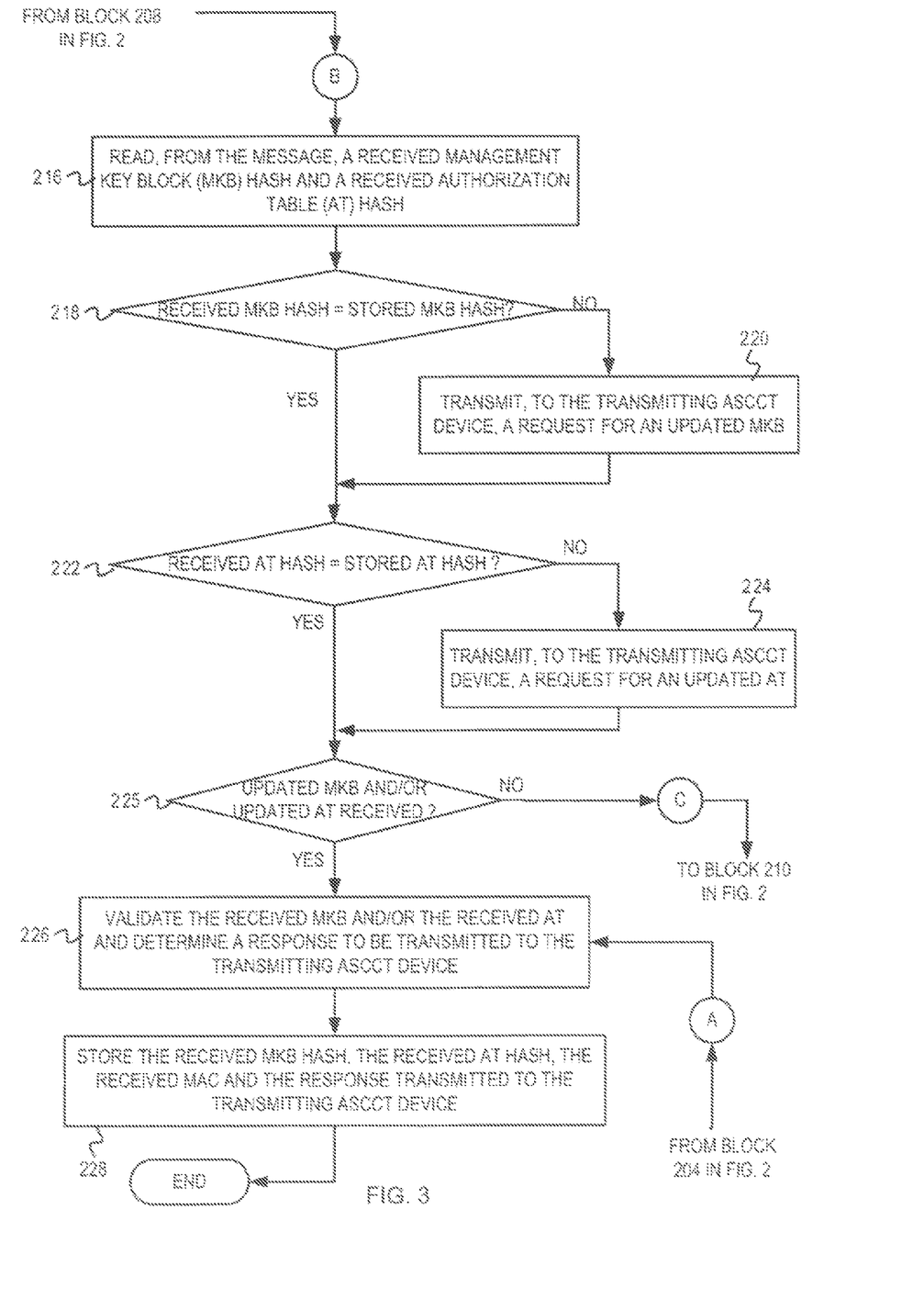

FIG. 2 and FIG. 3 depict a flow diagram illustrating example operations for establishing device compliance in an ASCCT network. Flow 200 begins at block 202 in FIG. 2.

An IMHERE message is received, at a receiving ASCCT device, from a transmitting ASCCT device (block 202). A foreign transmitting ASCCT device requesting to be validated for potential membership in a network (e.g., the network to which the receiving ASCCT device belongs) may transmit the IMHERE message. A previously authorized transmitting ASCCT device in the network may also periodically transmit the IMHERE message to maintain compliance with other ASCCT devices of the network. The IMHERE message comprises an identifier of the transmitting ASCCT device, a MKB hash, and an AT hash. The MKB hash and the AT hash respectively represent a latest version of a management key block and an authorization table available at the transmitting ASCCT device. The flow continues at block 204.

It is determined whether stored data associated with the transmitting ASCCT device is available (block 204). The device identifier of the transmitting ASCCT device may be read from the received IMHERE message and may be compared against stored device identifiers in a validated devices database to determine whether the stored data associated with the transmitting ASCCT device is available. The stored data associated with the transmitting ASCCT device can include a stored MKB hash, a stored AT hash, and a stored message authentication code (MAC). The stored data associated with the transmitting ASCCT device can also include a stored response provided in response to a first IMHERE message received from the transmitting ASCCT device. The stored MKB hash, the stored AT hash, and the stored MAC were received in the first IMHERE message received from the transmitting ASCCT device. Storing the MKB hash, the AT hash, the MAC, and the response associated with first IMHERE message received from the transmitting ASCCT device precludes the receiving ASCCT device from re-authenticating the transmitting ASCCT device and recalculating the response if input parameters of the received IMHERE message (e.g., a received MKB hash, a received AT hash, etc.) match corresponding values of the stored data associated with the transmitting ASCCT device (e.g., the stored MKB hash, the stored AT hash, etc.). If it is determined that the stored data associated with the transmitting ASCCT device is available, the flow continues at block 206. Otherwise, the flow continues at block 224 in FIG. 3.

The MAC of the received IMHERE message ("received MAC") is read from the received IMHERE message (block 206). The received MAC is a cryptographic hash of input parameters of the received IMHERE message and is indicative of the integrity, authenticity, and source of the received IMHERE message. At the transmitting ASCCT device, the input parameters of the IMHERE message and a secret key (e.g., a shared management key) may be provided as inputs to a MAC function to yield the MAC of the IMHERE message. In one implementation, a cipher-based MAC (CMAC) may be calculated. In another implementation, a hash-based MAC (HMAC) may be calculated. The MAC can be appended to the input parameters of the IMHERE message and can be transmitted as part of the IMHERE message. The flow continues at block 208.

It is determined whether the received MAC is equal to the stored MAC associated with the transmitting ASCCT device (block 208). The stored MAC associated with the transmitting ASCCT device is a MAC of the first IMHERE message that was broadcast by the transmitting ASCCT device. Comparing the received MAC with the stored MAC can indicate whether the input parameters of the received IMHERE message are different from the input parameters of the first IMHERE message. In other words, if the received MAC is equal to the stored MAC, it can be assumed that A) the input parameters of the received IMHERE message have not changed and B) that the versions of the MKB and the AT available at the transmitting ASCCT device have not changed since the last time the transmitting ASCCT device was validated. If the received MAC is not equal to the stored MAC, further comparisons can be performed to determine whether the MKB and/or the AT has changed as will be described with reference to blocks 216-228 in FIG. 3. If it is determined that the received MAC is equal to the stored MAC, the flow continues at block 210. Otherwise, the flow continues at block 216 in FIG. 3.

A stored response previously provided to the transmitting ASCCT device is determined (block 210). The validated devices database can be accessed to determine the stored response previously provided to the transmitting ASCCT device. In some implementations, the stored response can be an entire response message (e.g., comprising headers, a body of the response message, etc.) that was provided to the transmitting ASCCT device. In other implementations, the stored response can be an indication of whether the transmitting ASCCT device was authorized or rejected. For example, the validated devices database may indicate "authorized" as the stored response if the transmitting ASCCT device was previously authorized to join the network. As another example, the validated devices database may indicate "rejected" as the stored response if the ability of the transmitting ASCCT device to decrypt content was revoked. The flow continues at block 212.

The receiving ASCCT device communicates with the transmitting ASCCT device in accordance with the stored response (block 212). On identifying the stored response previously provided to the transmitting ASCCT device, the receiving ASCCT device can determine whether the stored response should be provided to the transmitting ASCCT device. Depending on the stored response, the receiving ASCCT device may or may not retransmit the stored response to the transmitting ASCCT device (e.g., respond to the received IMHERE message). For example, the receiving ASCCT device may not retransmit the stored response to the transmitting ASCCT device on determining that the transmitting ASCCT device was previously authorized. The receiving ASCCT device may continue to share content with and communicate with the transmitting ASCCT device if the transmitting ASCCT device was previously authorized. As another example, the receiving ASCCT device may retransmit the stored response to the transmitting ASCCT device on determining, that the transmitting ASCCT device was previously rejected. If it is determined that the stored response should be provided to the transmitting ASCCT device, the stored response can be encapsulated into an appropriate response message before being provided to the transmitting ASCCT device. For example, if the stored response indicates "rejected", an appropriate response message indicating rejection of the transmitting ASCCT device can be generated and provided to the transmitting ASCCT device. In some implementations, one or more parameters of the stored response message may be updated before being provided to the transmitting ASCCT device. For example, a timestamp of the stored response message can be updated and the updated response message can be provided to the transmitting ASCCT device. From block 212, the flow ends.

The received MKB hash and the received AT hash are read from the received IMHERE message (block 216 of FIG. 3). The flow 200 moves from block 208 in FIG. 2 to block 216 in FIG. 3 if it is determined that the received MAC is not equal to the stored MAC associated with the transmitting ASCCT device. The IMHERE message can be parsed to read the received MKB hash and the received AT hash from the received IMHERE message. The received MKB hash is indicative of a current version of the MKB available at the transmitting ASCCT device. The transmitting ASCCT device can use an Advanced Encryption Standard (AES) based hashing algorithm to calculate the hash of the current version of the MKB to generate the MKB hash and can provide the MKB hash to the receiving ASCCT device in the IMHERE message. Likewise, the received AT hash is indicative of a current version of the AT available at the transmitting ASCCT device. The transmitting ASCCT device can use the AES based hashing algorithm to calculate the hash of the current version of the AT to generate the AT hash and can provide the AT hash to the receiving ASCCT device in the IMHERE message. In other implementations, however, any suitable cryptographic hash algorithm (e.g., MD5) can be used to calculate the MKB hash and the AT hash. The flow continues at block 218.

It is determined whether the received MKB hash is equal to the stored MKB hash associated with the transmitting ASCCT device (block 218). The received MKB hash being equal to the stored MKB hash indicates that the version of the MKB available at the transmitting ASCCT device has not changed since the last time the transmitting ASCCT device was validated. If it is determined that the received MKB hash is equal to the stored MKB hash associated with the transmitting ASCCT device, the flow continues at block 222. Otherwise, the flow continues at block 220.

A request for an updated MKB is transmitted to the transmitting ASCCT device (block 220). The flow 200 moves from block 218 to block 220 on determining that the received MKB hash is not equal to the stored MKB hash. The updated MKB can be created and can be distributed by a content provider to enforce compliance to a content control system (CCS) for the ASCCT network controlled by the content provider. The updated MKB can serve as a permanent control mechanism of revoking an ASCCT device's ability to decrypt protected content in the ASCCT network. In one implementation, the updated MKB may be received concurrent with the content (e.g., at the beginning of a cable broadcast). In another implementation, the updated MKB may be obtained "out-of-band" from a broadcast or internet service, from other ASCCT devices, or from physical media (e.g., media comprising pre-recorded and recordable content). In another implementation, the request for the updated MKB may be transmitted in a getMKB message. The getMKB message can indicate a request that the transmitting ASCCT device provide a most recent version of the MKB available at the transmitting ASCCT device. It is noted that the transmitting ASCCT device need not be a previously validated device in order to receive a request for the updated MKB. A request for the updated MKB can be transmitted to any ASCCT device that potentially has a new/updated MKB. In a home network, the receiving ASCCT device may receive the updated MKB from the transmitting ASCCT device that is connected to a broadcast channel or other authorized external sources. For example, a set-top box may receive the updated MKB via a web service and may communicate the updated MKB to the other ASCCT devices in the home network. As another example, a content player (e.g., a Blu-Ray player) may receive the updated MKB via a pre-recorded disk comprising the ASCCT-protected content (e.g., a Blu-Ray disk) and may communicate the updated MKB to the other ASCCT devices in the home network. The flow continues at block 222.

It is determined whether the received AT hash is equal to a stored AT hash associated with the transmitting ASCCT device (block 222). The flow 200 also moves from block 218 to block 222 if it is determined that the received MKB hash is equal to the stored MKB hash associated with the transmitting ASCCT device. The received AT hash being equal to the stored AT hash associated with the transmitting ASCCT device indicates that the version of the authorization table available at the transmitting ASCCT device has not changed since the last time the transmitting ASCCT device was validated. If it is determined that the received AT hash is equal to the stored AT hash associated with the transmitting ASCCT device, the flow continues at block 225. Otherwise, the flow continues at block 224.

A request for an updated AT is transmitted to the transmitting ASCCT device (block 224). A content provider may issue messages that cause the state of devices in an ASCCT network to be changed, resulting in the updated AT. For example, the content provider may issue a "suspend" message or a "invalidate" message to respectively indicate that an ASCCT device is suspended or that the ASCCT device was invalidated. The updated AT can serve as a permanent control mechanism of revoking an ASCCT device's ability to decrypt protected content in the ASCCT network. In one implementation, the request for the updated AT may be transmitted in a getAT message. The getAT message can indicate a request that the transmitting ASCCT device provide a most recent version of the AT available at the transmitting ASCCT device. It is noted that the transmitting ASCCT device need not be a previously validated device in order to receive a request for the updated AT. The request for the updated AT can be transmitted to any ASCCT device that potentially has a new/updated AT. The flow continues at block 225.

It is determined whether the updated MKB and/or the updated AT were received (block 225). The receiving ASCCT device determines whether the updated MKB (and/or the updated AT) were received from the transmitting ASCCT device if it is determined that the received MKB hash is not equal to the stored MKB hash (and/or that the received AT hash was not equal to the stored AT hash). If it is determined that the updated MKB and/or the updated AT were received, the flow continues at block 226. Otherwise, the flow continues at block 210 in FIG. 2.

The received MKB and/or the received AT are validated and a response to be transmitted to the transmitting ASCCT device is determined (block 226). The flow 200 also moves from block 204 of FIG. 2 to block 226 of FIG. 3 on determining that the stored data associated with the transmitting ASCCT device is not available. As described with reference to FIG. 1, a signature, version, and/or other properties of the MKB can be validated on receiving a copy of the MKB from the transmitting ASCCT device. Likewise, a signature and/or other properties of the AT can be validated on receiving a copy of the AT from the transmitting ASCCT device.

In some implementations, prior to validating the received MKB and/or the received AT, a MAC of the input parameters of the received IMHERE message may be calculated ("calculated MAC"). The calculated MAC may be compared against the received MAC to verify integrity of the received IMHERE message. If the calculated MAC matches the received. MAC, operations as described above may be executed to validate the received MKB and/or the received AT. Otherwise, the received IMHERE message may be discarded and a rejection response message may be transmitted to the transmitting ASCCT device. Based on validating the received MKB and/or the received AT, a new response to be provided to the transmitting ASCCT device is also generated. For example, the transmitting ASCCT device may have been previously authorized to join the network. The transmitting ASCCT device may provide the updated MKB to the receiving ASCCT device. Based on validating the updated MKB, it may be determined that the transmitting ASCCT device has been revoked. Accordingly, a new response can be generated to reject the transmitting ASCCT device. The flow continues at block 228.

The received MKB hash, the received AT hash, the received MAC, and the response transmitted to the transmitting ASCCT device are stored (block 228). In some implementations, a new entry may be created in the validated devices database to store the received MKB hash, the received AT hash, the received MAC, and the response to the IMHERE message. In other implementations, the stored data associated with a previously authorized ASCCT device may be updated to reflect new values of the received MKB hash, the received AT hash, the received MAC, and/or the new response to the transmitting ASCCT device. It is noted that in some implementations, other input parameters of the received IMHERE message may also be stored. From block 228, the flow ends.

It should be understood that the depicted diagrams (FIGS. 1 through 3) are examples meant to aid in understanding embodiments and should not be used to limit embodiments or limit scope of the claims. Embodiments may perform additional operations, fewer operations, operations in a different order, operations in parallel, and some operations differently. For instance, in some implementations, the message processing unit 122 may not store the MAC of the first IMHERE message received from the transmitting ASCCT device 102. Consequently, the message processing unit 122 may not compare the received MAC 112 against the stored MAC. Instead, the message processing unit 122 may compare the received MKB hash 108 against the stored MKB hash to determine whether the MKB available at the transmitting ASCCT device 102 has been updated. Likewise, the message processing unit 122 can compare the received AT hash 110 against the stored AT hash to determine whether the AT available at the transmitting ASCCT device 102 has been updated.

It is noted that because the IMHERE message 106 is a broadcast message, all the ASCCT devices in the network receive the IMHERE message. Although FIG. 1 depicts the network comprising one ASCCT device 120, embodiments are not so limited and networks can comprise any suitable number of ASCCT devices. Each of the ASCCT devices in the network can receive and process the IMHERE message 106 as described above to determine the validity of the MKB and the AT available at the transmitting ASCCT device 102. Lastly, it is noted that the operations described with reference to FIGS. 1-4 are not restricted to ASCCT compliant devices and can be extended for processing other suitable repeatedly transmitted device compliance messages (e.g., beacon messages, control message for synchronization, etc.). Moreover, the operations are not restricted to maintaining compliance between devices in a home network or a personal area network (PAN). The operations described herein can also be extended to larger networks (such as a local area network), devices that form an authorized domain and that enforce the Advanced Access Content System (AACS) standard (e.g., typically used for protecting data on optical discs), 4C standards such as content protection for recordable media (CPRM) (e.g., typically used for protecting data on SD Cards and DVDs), and content protection for pre-recorded media (CPPM) etc.

It is further noted that although FIGS. 1-4 describe the ASCCT devices executing operations to ensure device compliance and exchange secured content, in other implementations, the ASCCT devices can execute the above described operations to ensure device compliance and to exchange information that governs access to physical resources (e.g., meters in an energy and utility infrastructure, cell phones and mobile devices in a telecommunications company secured content). Furthermore, the operations described herein are not restricted to computers, media devices, and other content players connected via wired or wireless networks such as the Internet. Devices that are not traditionally networked (e.g., "smart" meters within energy and utilities and health monitoring devices (e.g., Home Health Care monitors) in healthcare) and that operate as data collection points in intelligent industry networks may also execute the operations described herein. Lastly, although examples refer to ASCCT devices receiving the MKB from a content provider or from another ASCCT device, it is noted that in other implementations, the ASCCT devices may receive and process the eMKB using techniques described herein.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
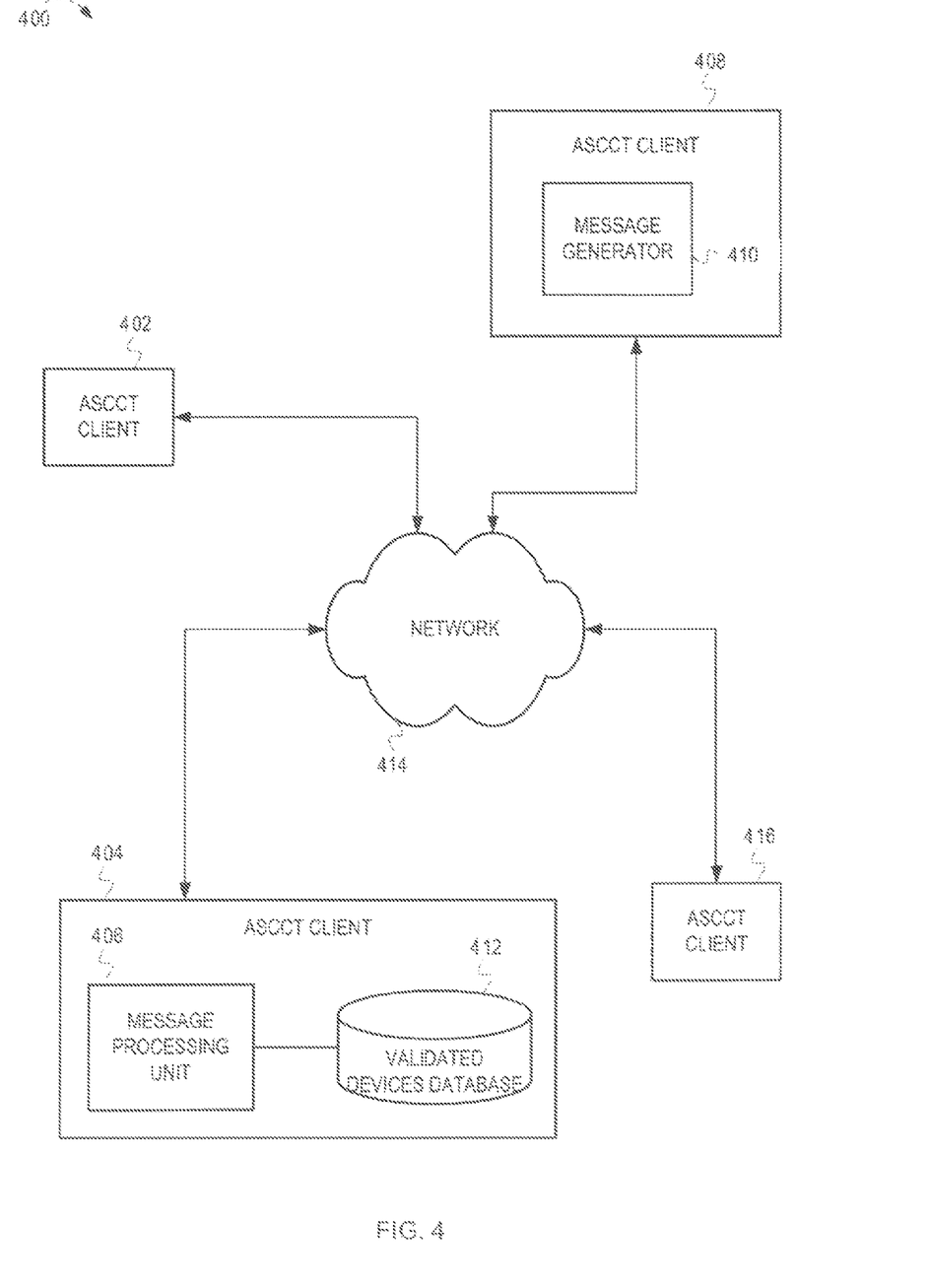
FIG. 4 is an example block diagram configured for establishing device compliance in an ASCCT domain.

FIG. 4 is an example block diagram configured for establishing device compliance in an ASCCT domain 400. The ASCCT domain 400 comprises four ASCCT clients 402, 404, 408, and 416. The ASCCT client 404 comprises a message processing unit 406 coupled with a validated devices database 412. Additionally, the ASCCT client 404 also comprises a message generator (not shown). The ASCCT client 408 comprises a message processing unit (not shown) 406, a validated devices database (not shown), and a message generator 410. The clients 402, 404, 408, and 416 may be embodied as the ASCCT device 500 of FIG. 5.

The ASCCT clients 402, 404, 408, and 416 share content bound by the authorized ASCCT domain 400 and periodically exchange device compliance messages (e.g., an IMHERE message) to maintain and verify device compliancy. The message generator 410 of the ASCCT client 408 generates and broadcasts an IMHERE message comprising a MKB hash, an AT hash, and a message authentication code (MAC). The MKB hash and the AT hash are indicative of a current version of the MKB and the AT respectively available at the ASCCT client 408. The other ASCCT clients 402, 404, and 416 of the ASCCT domain 400 receive the IMHERE message broadcast by the ASCCT client 408. The validated devices database 412 of the ASCCT client 404 comprises a stored MKB hash, a stored AT hash, a stored MAC, and a stored response associated with each of the other validated ASCCT clients 402, 408, and 416 in the ASCCT domain 400. The stored MKB hash, the stored AT hash, the stored MAC associated with the ASCCT client 408 are retrieved from a first IMHERE message transmitted by the ASCCT client 408. The stored response is a response generated by the ASCCT client 404 in response to the first IMHERE message transmitted by the ASCCT client 408. The message processing unit 406 of the ASCCT client 404 compares a received MKB hash and a received AT hash of the IMHERE message with the stored MKB hash associated with the ASCCT client 408 and the stored AT hash associated with the ASCCT client 408 respectively. On determining that the received MKB hash is equal to the stored MKB hash and that the received AT hash is equal to the stored AT hash, the message processing unit 406 identifies the stored response associated with the ASCCT client 408. The ASCCT client 404 communicates with the ASCCT client 408 in accordance with the stored response as described above with reference to FIGS. 1-3.

The ASCCT clients 402, 404, 408, and 416 communicate via a communication network 414. The ASCCT clients 402, 404, 408, and 416 may communicate, over the communication network 414, in a peer-to-peer manner or via a centralized server. The communication network 414 can include any wired or wireless technology (e.g., Ethernet, IEEE 802.11a/b/g/n, SONET, etc) suitable for passing communication between the clients 402, 404, 408, and 416. The communication network may be implemented as a local area network (LAN), a metropolitan area network (MAN), a wide area network (WAN), an interconnected LAN, etc. Moreover, the communication network 414 can be part of other networks, such as cellular telephone networks, public-switched telephone networks (PSTN), cable television networks, etc. Additionally, the clients 402, 404, 408, and 416 can be any suitable devices capable of executing software in accordance with the embodiments described herein. The message generator 410 and/or the message processing unit 406 may be implemented as a chip, plug-in, code in memory, etc.

Figure 5:
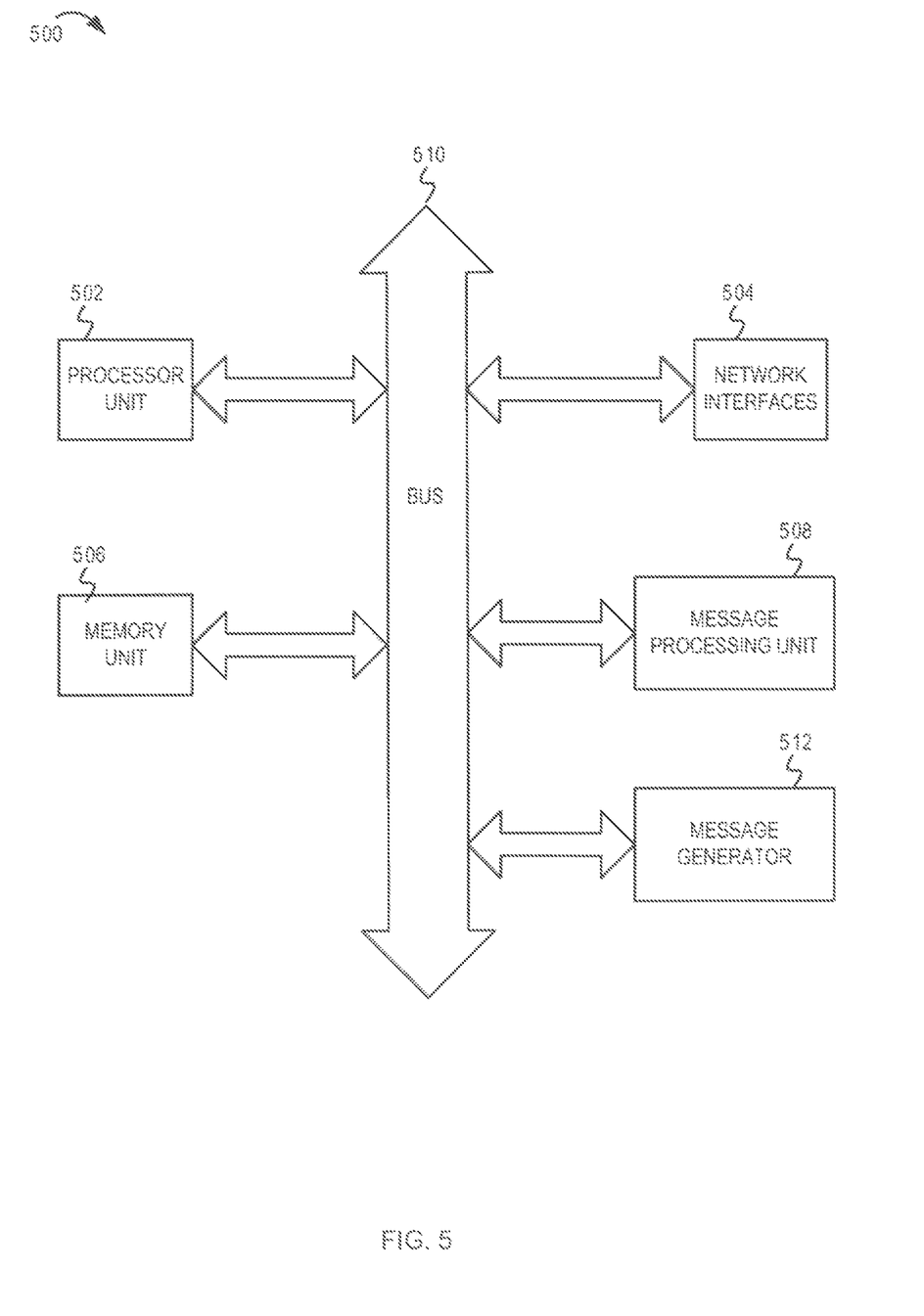
FIG. 5 is a block diagram of one embodiment of an electronic device configured for processing device compliance messages.

FIG. 5 is a block diagram of one embodiment of an electronic device 500 configured for processing device compliance messages. In some implementations, the electronic device 500 may be an ASCCT compliant device (e.g., a Blu Ray disk player, a smart meter, a health care monitor, etc.). In another implementation, the electronic device 500 may be a network device (e.g., a WLAN device, a Bluetooth device, etc) that periodically transmits device compliance messages. The electronic device 500 includes a processor unit 502 (possibly including multiple processors, multiple cores, multiple nodes, and/or implementing multi-threading, etc.). The electronic device 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 500 also includes a bus 510 (e.g., PCI, ISA, PCI-Express, HyperTransport®, Infini-Band®, NuBus, etc.), and network interfaces 504 that include at least one wireless network interface (e.g., a WLAN interface, a Bluetooth® interface, a WiMAX interface, a ZigBee® interface, a Wireless USB interface, etc.).

The electronic device 500 also comprises a message processing unit 508 and a message generator 512 coupled to the bus 510. The message generator 512 generates, among other messages, device compliance messages (e.g., an IMHERE message) and periodically broadcasts the device compliance messages to other ASCCT compliant devices. On receiving an IMHERE message from another ASCCT device, the message processing unit 508 performs operations for validating the IMHERE message and ensuring device compliance based on previously stored data (in a validated devices database) associated with the transmitting ASCCT device, as described with reference to FIGS. 1-4. Any one of these functionalities may be partially (or entirely) implemented in hardware and/or on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., video cards, audio cards, additional network interfaces, peripheral devices, etc.). The processor unit 502, the storage device(s), and the network interface 504 are coupled to the bus 510. Although illustrated as being coupled to the bus 510, the memory 506 may be coupled to the processor unit 502.

While the embodiments are described with reference to various implementations and exploitations, it will be understood that these embodiments are illustrative and that the scope of the inventive subject matter is not limited to them. In general, techniques for improving processing performance of repeated device compliance messages as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:

receiving, at a first network device, a first message comprising at least a received indication of a management key block and a received indication of an authorization table from a second network device, wherein the management key block is a block of cryptographic key data, wherein the authorization table indicates devices authorized to share protected content on a network associated with the first network device and the second network device;

validating the received indication of the management key block and the received indication of the authorization table, wherein said validating the received indication of the management key block comprises generating an indication of the management key block and comparing the generated indication of the management key block with the received indication of the management key block, wherein said validating the received indication of the authorization table comprises generating an indication of the authorization table and comparing the generated indication of the authorization table with the received indication of the authorization table, generating a response to the first message received from the second network device based on said validating the received indication of the management key block and the received indication of the authorization table;

transmitting, via a communication network to the second network device, the response to the first message;

storing, at the first network device, the generated indication of the management key block, the generated indication of the authorization table, and the response;

receiving, at the first network device, a second message comprising at least a second received indication of the management key block and a second received indication of the authorization table from the second network device;

determining that the second received indication of the management key block matches the stored indication of the management key block and that the second received indication of the authorization table matches the stored indication of the authorization table; and communicating with the second network device in accordance with the stored response associated with the first message based, at least in part, on said determining that the second received indication of the management key block matches the stored indication of the management key block and that the second received indication of the authorization table matches the stored indication of the authorization table.

2. The method of claim 1, further comprising storing, at the first network device, an indication of the first message, wherein the first message further comprises the indication of the first message, and wherein said generating the response to the first message received from the second network device is further based on validating the indication of the first message.

3. The method of claim 2, wherein the indication of the first message is a first message authentication code associated with the first message.

4. The method of claim 2, wherein said determining that the second received indication of the management key block matches the stored indication of the management key block and that the second received indication of the authorization table matches the stored indication of the authorization table further comprises:

comparing an indication of the second message with the stored indication of the first message.

5. The method of claim 1, wherein the received indication of the management key block comprises a hash value of a management key block associated with the second network device and the received indication of the authorization table comprises a hash value of an authorization table associated with the second network device.

6. The method of claim 1, wherein the received indication of the management key block comprises a hash value of an enhanced management key block associated with the second network device and the received indication of the authorization table comprises a hash value of an authorization table associated with the second network device.

7. The method of claim 1, wherein said determining that the second received indication of the management key block matches the stored indication of the management key block and that the second received indication of the authorization table matches the stored indication of the authorization table further comprises:

comparing the second received indication of the management key block against the stored indication of the management key block; and comparing the second received indication of the authorization table against the stored indication of the authorization table.

8. The method of claim 1, further comprising:

receiving, at the first network device, a third message comprising at least a third received indication of the management key block and a third received indication of the authorization table from the second network device;

determining at least one of that the third received indication of the management key block does not match the stored indication of the management key block and that the third received indication of the authorization table does not match the stored indication of the authorization table;

requesting, from the second network device, one of a new management key block and a new authorization table.

9. The method of claim 8, further comprising:

generating a new response to the third message received from the second network device based on validating the third received indication of the management key block and the third received indication of the authorization table;

storing, at the first network device, at least one of the third received indication of the management key block, the third received indication of the authorization table, and the new response associated with the third message.

10. The method of claim 1, wherein the first network device and the second network devices are Advanced Secure Content Clustering Technology (ASCCT) clients.

11. The method of claim 1, wherein said communicating with the second network device in accordance with the stored response associated with the first message further comprises one of:

sharing content with the second network device in response to determining that the stored response indicates authorization of the second network device, and transmitting a rejection response message to the second network device in response to determining that the stored response indicates rejection of the second network device.

12. A computer program product for processing repeated device compliance messages, the computer program product comprising:

a non-transitory computer readable storage medium having computer readable program code embodied therewith, the computer readable program code configured to, receive, at a first network device, a first message comprising at least a received indication of a management key block and a received indication of an authorization table from a second network device, wherein the management key block is a block of cryptographic key data, wherein the authorization table indicates devices authorized to share protected content on a network associated with the first network device and the second network device;

validating the received indication of the management key block and the received indication of the authorization table, wherein said validating the received indication of the management key block comprises generating an indication of the management key block and comparing the generated indication of the management key block with the received indication of the management key block, wherein said validating the received indication of the authorization table comprises generating an indication of the authorization table and comparing the generated indication of the authorization table with the received indication of the authorization table;

generate a response to the first message received from the second network device based on said validating the received indication of the management key block and the received indication of the authorization table;

transmit, via a communication network to the second network device, the response to the first message;

store, at the first network device, the generated indication of the management key block, the generated indication of the authorization table, and the response;

receive, at the first network device, a second message comprising at least a second received indication of the management key block and a second received indication of the authorization table from the second network device;
determine that the second received indication of the management key block matches the stored indication of the management key block and that the second received indication of the authorization table matches the stored indication of the authorization table; and
communicate with the second network device in accordance with the stored response associated with the first message based, at least in part, on said determining that the second received indication of the management key block matches the stored indication of the management key block and that the second received indication of the authorization table matches the stored indication of the authorization table.

13. The computer program product of claim 12, wherein the computer readable program code is further configured to:
store, at the first network device, an indication of the first message, wherein the first message further comprises the indication of the first message, and wherein the computer readable program code configured to generate the response to the first message received from the second network device is further based on the computer readable program code configured to validate the indication of the first message.

14. The computer program product of claim 13, wherein the computer readable program code configured to determine that the second received indication of the management key block matches the stored indication of the management key block and that the second received indication of the authorization table matches the stored indication of the authorization table further comprises the computer readable program code configured to:
compare an indication of the second message with the stored indication of the first message.

15. The computer program product of claim 12, wherein the computer readable program code configured to determine that the second indication of the management key block matches the stored indication of the management key block and that the second indication of the authorization table matches the stored indication of the authorization table further comprises the computer readable program code configured to:
compare the second received indication of the management key block against the stored indication of the management key block; and
compare the second received indication of the authorization table against the stored indication of the authorization table.

16. The computer program product of claim 12, wherein the computer readable program code is further configured to:
receive, at the first network device, a third message comprising at least a third received indication of the management key block and a third received indication of the authorization table from the second network device;
determine at least one of that the third received indication of the management key block does not match the stored indication of the management key block and that the third received indication of the authorization table does not match the stored indication of the authorization table; and
request, from the second network device, one of a new management key block and a new authorization table.

17. The computer program product of claim 16, wherein the computer readable program code is further configured to:

generate a new response to the third message received from the second network device based on the computer readable program code validating the third received indication of the management key block and the third received indication of the authorization table; and
store, at the first network device, at least one of the third received indication of the management key block, the third received indication of the authorization table, and the new response associated with the third message.

18. The computer program product of claim 12, wherein the computer readable program code configured to communicate with the second network device in accordance with the stored response associated with the first message further comprises one of:
the computer readable program code further configured to share content with the second network device in response to the computer readable program code determining that the stored response indicates authorization of the second network device, and
the computer readable program code further configured to transmit a rejection response message to the second network device in response to a determination that the stored response indicates rejection of the second network device.

19. A system comprising:
a processor;
a network interface coupled with the processor, the network interface operable to,
receive a first message comprising at least a received indication of a management key block and a received indication of an authorization table from a second system, wherein the management key block is a block of cryptographic key data, wherein the authorization table indicates devices authorized to share protected content on a network associated with a first network device and a second network device;
a message processing unit operable to, via the processor, validating the received indication of the management key block and the received indication of the authorization table,
wherein said validating the received indication of the management key block comprises generating an indication of the management key block and comparing the generated indication of the management key block with the received indication of the management key block,
wherein said validating the received indication of the authorization table comprises generating an indication of the authorization table and comparing the generated indication of the authorization table with the received indication of the authorization table;
generate a response to the first message received based on said validating the received indication of the management key block and the received indication of the authorization table;
transmit, via a communication network to the second system, the response to the first message;
storing, in a validated devices database, the generated indication of the management key block, the generated indication of the authorization table, and the response;
the network interface further operable to,
receive a second message comprising at least a second received indication of the management key block and a second received indication of the authorization table from the second system;
the message processing unit further operable to,
determine that the second received indication of the management key block matches the stored indication of the management key block and that the second received indication of the authorization table matches the stored indication of the authorization table; and communicate with the second system in accordance with the stored response associated with the first message based, at least in part, on the message processing unit determining that the second received indication of the management key block matches the stored indication of the management key block and that the second received indication of the authorization table matches the stored indication of the authorization table.

20. The apparatus of claim 19, wherein the message processing unit comprises computer readable storage media.

\* \* \* \* \*